Patented July 1, 1930

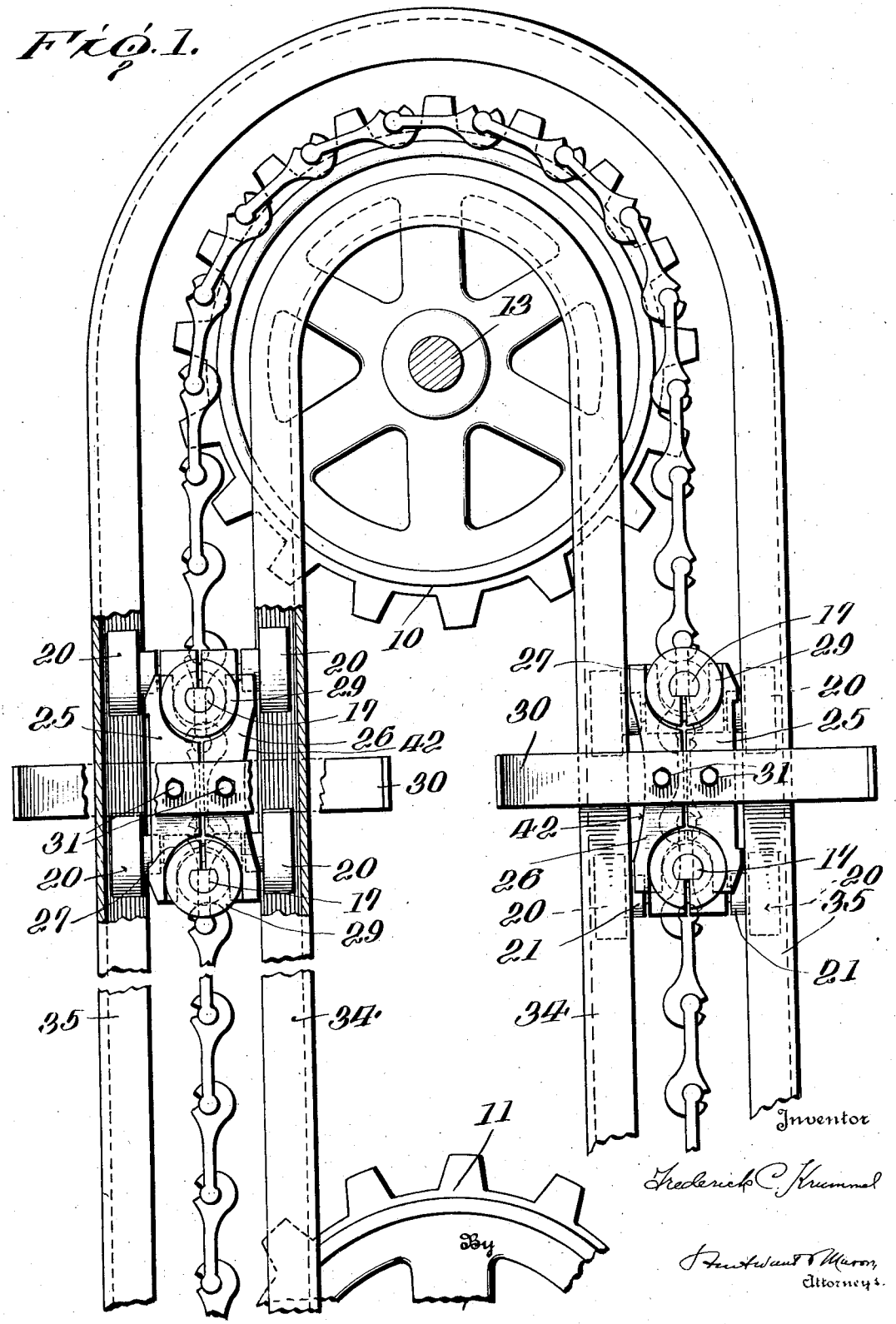

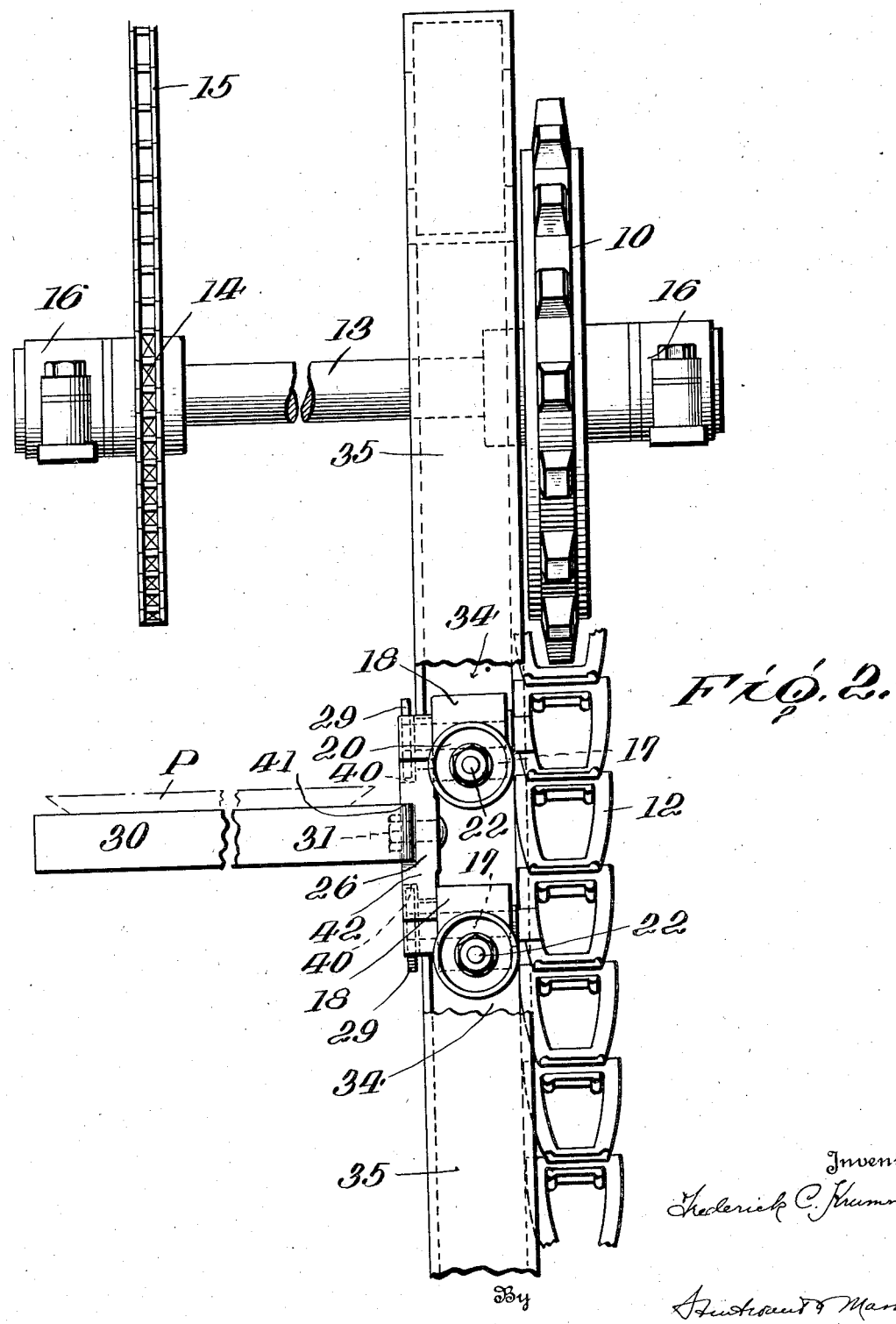

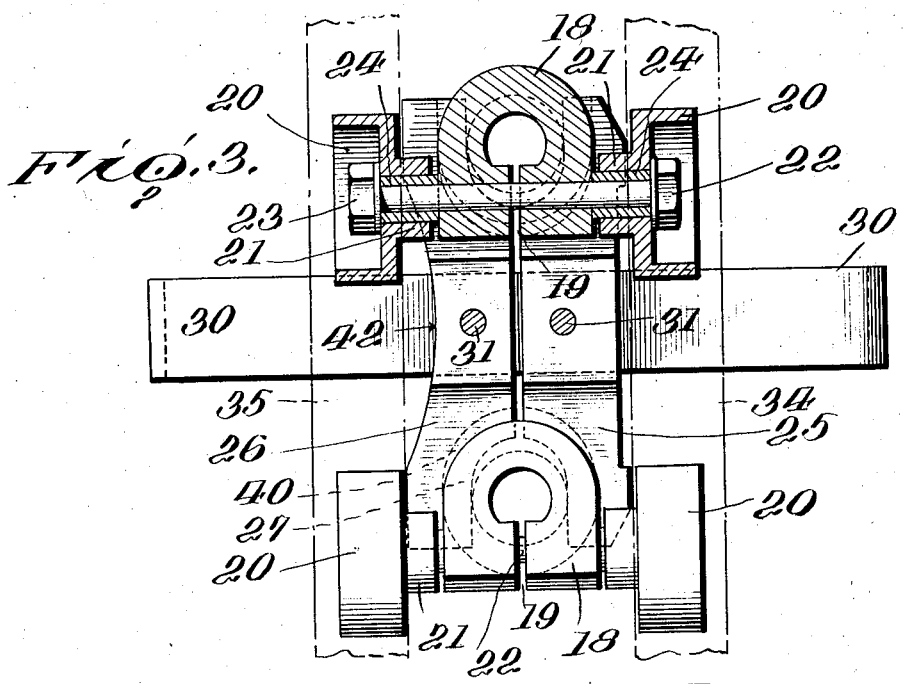
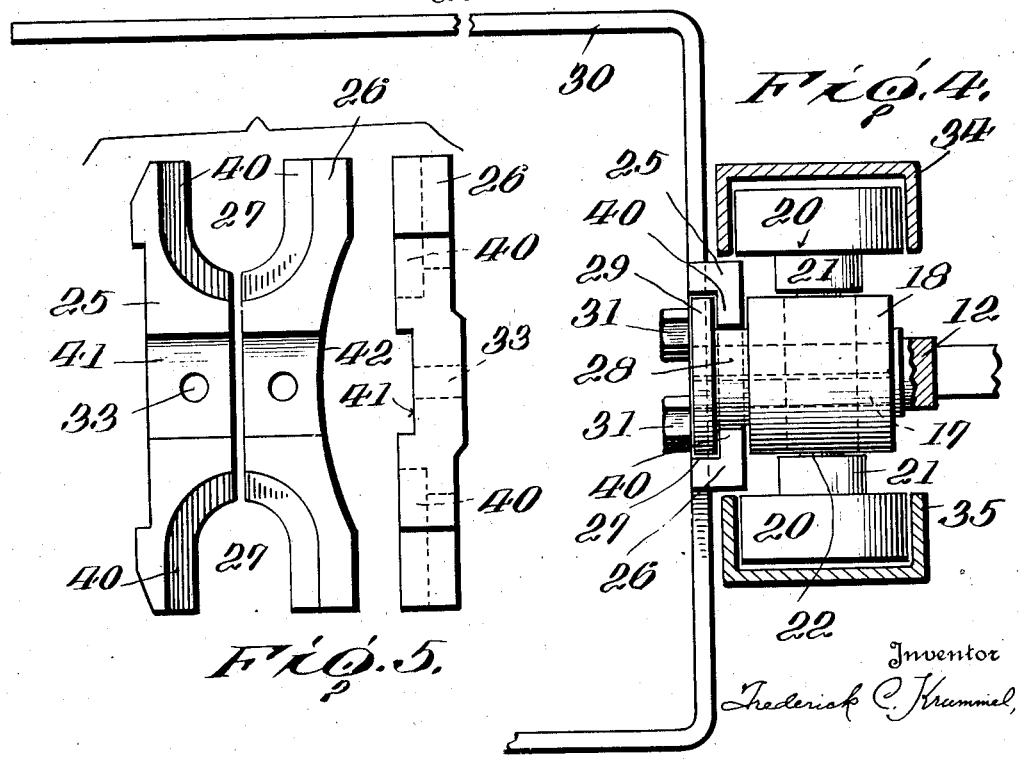

1,769,348

UNITED STATES PATENT OFFICE

FREDERICK C. KRUMMEL, OF BROOKLYN, NEW YORK

CONVEYER

Application filed November 27, 1928. Serial No. 322,192.

This invention relates to improvements in conveyers of the endless chain type having brackets to receive the articles to be conveyed.
One of the purposes of the present invention is to provide a conveyer of this type in which carriages are provided to travel in guides between the chain sprockets, with roller members operating in the guides and having their axes located substantially in a common plane.

Another feature of the present invention is a simplified form of carriage which is easily dismounted and reassembled in position upon the chain.

Another feature of the present invention is the provision of a carriage which comprises few parts and is adapted to be easily placed upon or removed from the chain, and in which the parts cooperate with one another to hold one another in the operative positions.

With these and other objects in view, as will appear in the course of the following specification and claims, an illustrative form of the invention is set forth on the accompanying drawings, in which:

Figure 1 is a side elevation, with partial section, of a conveyer of the present type, employed for vertical lifting and lowering.

Fig. 2 is a corresponding elevational view at a right angle to that of Fig. 1.

Fig. 3 is a detailed view on an enlarged scale of a carriage assembly, partly in section along the plane of the axes.

Fig. 4 is a top plan view of a carriage.

Fig. 5 is a plan view and an edge view of the carriage clamping block.

According to the present invention, the illustrative construction shows that an endless chain passes over a pair of sprocket members, forming ascending and descending flights. Certain of the links are provided with pins extending in directions parallel to the sprocket axes, and receiving sleeves having shafts thereon for guide rollers traveling in vertical guide channels. The axes of the respective rollers are located substantially in a single plane, in both the ascending and descending flights and in the passage of these rollers around the sprockets: this plane is at a right angle to the axes of the sprockets and of the rollers themselves. Joining two of these sleeves is a clamping block which receives the shelf bracket proper.

Referring to the drawings, the upper sprocket 10 and lower sprocket 11 of the conveyer have suitable teeth to receive an endless conveyer chain 12 of any suitable and usual pattern. The upper sprocket 10 is shown as provided with a shaft 13 having a further sprocket 14 thereon for a driving means 15: the shaft 13 being illustrated as supported by bearings 16. It will be understood that the distance between the upper sprocket 10 and the drive sprocket 14 is sufficient for the passage of the shelf brackets, this being indicated on the drawings by breaking away the shaft 13 in Fig. 2.

The cooperating portions of the links 12 are all alike, and these links may be made of the same pattern: while at intervals along the chain, some of these links have pins 17 fixed rigidly thereto and extending laterally therefrom in a direction parallel to the axis of shaft 13. It is preferred to mount these pins 17 intermediate the length of links, and so that the pins are two link lengths apart (Fig. 1).

These pins 17 each receive a sleeve 18, which has a split 19 therein in order that the sleeve may be clamped down upon the pin 17: the pin 17 having a flat and the sleeve 18 a chordal portion so that the pin and sleeve are held fixedly together. The rollers 20 are preferably formed with recessed ends and reduced extended bearing portions 21 directed toward the sleeve 18. A passage through the sleeve 18 across the split 19 permits the insertion of a clamping bolt 22 through the one roller 20, the clamping sleeve 18 and the other roller 20, the nut 23 serving to hold the parts together. The rollers 20 do not turn directly upon the bolt 22 but are located about the bearing bushings 24 which are of slightly greater length than the length of the bearing portion of the respective roller 20, so that when the nut 23 and bolt 22 are drawn tight, pressure is transmitted between them along the bushings 24 to clamp the sleeve 18 upon the pin 17, all the while permitting the free rotation of the rollers 20.

The clamping members 25, 26 are formed so that when combined they have notches 27 at the ends thereof to fit around a reduced portion 28 in the sleeve 18 (Fig. 4), this sleeve 18 having an enlarged circular collar 29 to hold the clamping members in position against movement in the direction of the respective pins 17.

The shelf bracket 30 is shown as a U-shaped strap of iron to support a tray, platform or the like P which is to be carried up and/or down on the conveyer. Two bolts 31 are passed through this U-shaped shelf bracket 30 into the threaded apertures 33 in the clamping member 25, 26, and serve to hold the shelf bracket on the clamping members 25, 26 and to hold these clamping members fixedly together and in a definite position around the sleeves 18, while permitting these sleeves 18 and the rollers thereon to swivel with respect to the clamping members 25, 26.

The endless channel guide members 34, 35 are provided to guide the rollers 20 for their whole travel, as shown in Fig. 1, and extend in straight lines between the sprockets 10, 11, and in circular paths about these sprockets concentric to their respective axes.

The method of operation of the conveyer thus described is as follows:

When the shaft 13 is set in rotation by the driving means 15, the sprocket 10 is turned, thus driving the endless chain 12 and therewith the sprocket 11. The chain 12 travels up in one flight and down in the other flight. The pins 17 fastened to the links of the chain 12 causes the blocks 18 to move positively therewith, and therewith the clamping blocks 25, 26 and the shelf brackets 30. As each successive carriage comes to the upper sprocket, and the axis of the corresponding pin 17 comes approximately to the horizontal plane through the shaft 13, the link of the chain begins to move in a circular path around the upper sprocket 10, and as it deviates from its former vertical position, the corresponding pin 17 held thereby is rotated, causing a rotation of the sleeve 18 by reason of the non-circular section of the pin 17 and the corresponding shape of the sleeve 18, so that the axis of the bolt 22, and therewith the axis of rotation of the respective rollers 20 is caused to deviate from its former horizontal position. It will be noted that the axis of the respective rollers 20 is held so that it is at all times substantially radial with respect to the shaft 13 while turning about the upper sprocket; and correspondingly with respect to the axis of the lower sprocket 11 while turning about the lower sprocket. The clamping members 25, 26 do not take part in this general turning movement, owing to the permissive rotation of the sleeve 18 within the fork formed by the members 25, 26, but do move into a position determined by the prevailing positions of the two pins 17 of the particular carriage. Owing to the free rocking of the clamping members 25, 26 and the sleeves 18 with respect to one another, this movement is freely permitted, and the shelf bracket 30 is likewise held substantially radial with regard to the respective sprocket during the passage of the carriage about the sprockets. The guide channels 34, 35 prevent movements of the sleeves 18 along the length of the pin 17, which might result in a dropping of the carriage.

As shown in Figs. 3, 4 and 5, the clamping members 25, 26 are preferably joined along a line intersecting the axis of the pins 17, and the two clamp members are bifurcated to receive the sleeves 18, the walls of the bifurcations being cut away to provide shelves 40 for the reception of the end collars 29 of the sleeves 18. The faces of the clamping members 25, 26 are likewise cut away transversely to form a groove 41 extending thereacross to receive the shelf bracket 30 with its outer face flush with the outer face of the clamping members 25, 26. Likewise, the edge of the clamping member 26 is cut away arcuately at 42 to afford clearance for the inner walls 20 as the trucks comprising these rollers and the sleeve 18 turn with respect to the clamping members 25, 26 in moving around the sprocket wheels.

It will particularly be noted that when the right hand flight of chain in Fig. 1 is the ascending flight, the axes of the rollers 20 are respectively behind the axes of the corresponding pins 17, so that there is a dragging or "caster" action of these rollers, and they tend at all times to remain properly in their guides 34, 35, and are assisted in this by the fixed relationship of their respective axes with regard to the respective pins 17 and therewith the roller axes are held always at right angles to the direction of the chain at the particular point.

It is obvious that the invention is not limited to the particular form of execution shown, but that it may be employed in many ways within the scope of the appended claims.

What I claim as new and desire to secure by Letters Patent is:

1. In a conveyer, sprockets, a chain traveling over said sprockets and comprising links, two of said links each having a pin projecting therefrom parallel to the axis of the sprocket, fixed guides extending parallel to the chain and concentric with the sprockets, guide means carried by each of said pins to cooperate with said fixed guides, a carriage pivotally mounted upon said pins and guide means, and an article holder fixed to said carriage.

2. A device as in claim 1, in which each guide means comprises a pair of rollers mounted on a common axis at a right angle to the axis of said pin.

3. A device as in claim 1, in which each guide means comprises a truck rigid with said pin and comprising a pair of rollers mounted on a common axis at a right angle to said pin axis, said fixed guides comprising fixed channel members extending parallel to the chain and concentric with said sprockets, the rollers being received in and guided by said channels.

4. In a conveyer, a carriage, a sprocket, a chain traveling over said sprocket and comprising links, pivotal connections between the ends of the carriage and two links of said chain, the axes of said pivotal connections extending parallel to the axis of the sprocket, guide rollers, bearings for said rollers fixed to move with respective links so that the respective axis of the bearing is always at a right angle to the direction of the link in the chain, said rollers guiding said pivotal connections, fixed guides to cooperate with said rollers and to hold said roller axes in a plane at a right angle to the sprocket axes, and an article holder on said carriage.

5. A device as in claim 4, in which the pivotal connection comprises a pin extending from the respective link in a direction at a right angle to the direction of the link in chain.

6. A device as in claim 4, in which the pivotal connection comprises a pin extending from the respective link in a direction parallel to the sprocket axes, and a peripherally grooved sleeve fixed on said pin, said carriage comprising sections embracing said sleeve and entering said groove whereby to permit free relative pivoting of the parts by preventing relative movement in the direction of the sleeve.

7. A device as in claim 4, in which the pivotal connection comprises a pin extending from the respective link in a direction parallel to the sprocket axes, and a peripherally grooved sleeve fixed on said pin, said carriage comprising sections embracing said sleeve and entering said groove whereby to permit free relative pivoting of the parts by preventing relative movement in the direction of the sleeve, said article holder serving to clamp said sections together.

8. A device as in claim 4, in which the pivotal connection comprises a pin extending from the respective link in a direction at a right angle to the direction of the link in chain, a split sleeve surrounding said pin, and a clamping bolt passing through said rollers and sleeve to hold said parts together and to clamp said sleeve upon said pin, said carriage being pivoted upon the split sleeve.

9. In a conveyer, sprockets, a chain traveling over said sprockets and comprising links, a carriage having an article holder thereon, inner and outer fixed channel guides extending parallel to the chain and concentric to the sprockets, two pairs of rollers traveling in said channels, bearings for each pair of said rollers extending at a right angle to the direction of the chain, means to fix each bearing to a link to turn therewith so that the roller axes are held substantially radial with respect to the sprockets in passing therearound and at a right angle to the direction of said guides between said sprockets, and respective pivotal connections between said bearings and said carriage.

In testimony whereof, I affix my signature.

FREDERICK C. KRUMMEL.